United States Patent [19]

Findeis et al.

[11] Patent Number: 4,464,045
[45] Date of Patent: Aug. 7, 1984

[54] METHOD OF AND AN ARRANGEMENT FOR CALIBRATING A COLOR COPYING APPARATUS

[75] Inventors: Günter Findeis, Sauerlach; Berthold Fergg, Taufkirchen; Wolfgang Zahn, Munich; Gerhard Kuhn, Leverkusen, all of Fed. Rep. of Germany

[73] Assignee: Agfa-Gevaert Aktiengesellschaft, Leverkusen, Fed. Rep. of Germany

[21] Appl. No.: 385,923

[22] Filed: Jun. 7, 1982

Related U.S. Application Data

[63] Continuation of Ser. No. 132,094, Mar. 20, 1980, abandoned.

[30] Foreign Application Priority Data

Mar. 23, 1979 [DE] Fed. Rep. of Germany ....... 2911566

[51] Int. Cl.³ ............................................. G03B 27/80
[52] U.S. Cl. ................................................... 355/38
[58] Field of Search ....................... 355/38, 41, 68, 35

[56] References Cited

U.S. PATENT DOCUMENTS 2,969,709  1/1961  Zeyen et al. ........................ 355/38
3,120,782  2/1964  Goddard et al. .................... 355/38
4,174,173  11/1979  Pone .................................... 355/38
4,222,661  9/1980  Wahli et al. ........................ 355/38
4,274,732  6/1981  Thurm et al. ....................... 355/38

Primary Examiner—Monroe H. Hayes
Attorney, Agent, or Firm—Peter K. Kontler

[57] ABSTRACT

A color copying apparatus having a photoelectric color exposure control device is calibrated by making a copy of a calibrating original, which includes a gray stepped wedge, on a photographic copying material using an exposure determined by the photoelectric color exposure control device and assumed to be proper for achieving the desired density values in the developed image of the calibrating original. The density of the developed image of the gray stepped wedge is then measured in order to obtain actual density values, which are compared with corresponding desired density values. Finally, the photoelectric color exposure control device is adjusted for achieving the required exposure correction as determined during the comparison of the actual and desired values. The calibration is performed for each of the individual values so that correction of the control device is also achieved for each of the corresponding colors.

27 Claims, 4 Drawing Figures

METHOD OF AND AN ARRANGEMENT FOR CALIBRATING A COLOR COPYING APPARATUS

This application is a continuation, of application Ser. No. 132,094, filed Mar. 20, 1980, now abandoned.

BACKGROUND OF THE INVENTION

The present invention relates to a method of and an arrangement for calibrating a photographic color copying apparatus in general, and more particularly for calibrating a copying apparatus in which photographic copying material is exposed to light in the three basic colors and in which the exposure is controlled by a photoelectric color exposure control device. Even more particularly, the present invention is concerned with calibration which is based on the evaluation of developed test images on the copying material.

One conventional approach in this respect was to produce a test image on the copying material from a calibrating original having a middle density, by resorting to the photoelectric color exposure control device. The developed image was then evaluated and, based on experience, there were made corrective adjustments of the photoelectric color exposure control device in such a manner that, presumably, the necessary changes in the exposures would occur resulting in a satisfactory quality of the copy. Thereafter, the copying operation was repeated with these corrections from the same calibrating original and, should these corrections indeed have brought about the desired result or at least a marked improvement of the quality of the test image, these corrective values were then stored in the corresponding storing potentiometers as changes in the sensitivity of the photoelectric color exposure control device. This approach was used, for instance, in German Pat. No. 2,246,544.

An important drawback of this approach was that it required the performance of a significant number of steps, the results of which depended on the subjective evaluation of the copied image and on the subjective determination of the needed corrective measures. As a result of this, in many instances, it was necessary to repeat the above-mentioned steps several times before the required adjustment of the photoelectric color exposure control device was arrived at.

OBJECTS AND SUMMARY OF THE INVENTION

Accordingly, it is a general object of the present invention to avoid the disadvantages of the prior art.

More particularly, it is an object of the present invention to provide a method of calibrating a photographic color copying material, which is not possessed of the disadvantages of the prior-art methods of this type.

It is a further object of the present invention to propose a calibrating method rendering it possible to calibrate the copying apparatus based on objective measurements and without any need to rely on subjective empirical values.

An additional object of the invention is to develop a calibrating method which renders it possible to arrive at the correct adjustment of the photoelectric color exposure control arrangement of the color copying apparatus in a single step in most instances.

A concomitant object of the instant invention is to provide a calibrating arrangement which is capable of satisfactorily performing the method of the present invention.

Yet another object of the present invention is to so design the calibrating arrangement as to be simple in construction, inexpensive to manufacture, and reliable in operation nevertheless.

In pursuance of these objects and others which will become apparent hereinafter, one feature of the present invention resides in a method of calibrating a color copying apparatus having a photoelectric color exposure control device, which method, briefly stated, comprises the steps of copying a calibrating original onto a photographic copying material using exposure determined by the photoelectric color exposure control device and assumed to be correct for achieving desired density values in the developed image of the calibrating original on the copying material; measuring the density of the developed image to obtain actual density values; comparing corresponding actual and desired density values with one another; and adjusting the photoelectric color exposure control device for the required exposure correction as determined during the comparing step.

Advantageously, the copying step includes passing predetermined amounts of light in the three basic colors through the calibrating original onto the copying material, and the measuring, comparing and adjusting steps are performed for each of the individual colors.

The present invention is based on the use of a synthetic calibrating original. This calibrating original includes, for instance, a seven-step gray stepped wedge of which the fourth step is exposed, for instance, to a middle density of 0.7. In addition thereto, the color composition of the stepped wedge is so selected that, in all seven fields of the stepped wedge, all three basic color components can be measured in a reliable and readily reproducible manner. The measurement of the developed reproductions of the gray fields of the calibrating original on a particular photographic copying material results in the development of a sensitometric curve which is characteristic for this particular copying material.

Now, when this calibrating original which has, as a whole, a middle density is copied on a customary copying material by resorting to the use of the photoelectrical color exposure control arrangement of the copying machine, then the copies or images of the individual fields of the gray stepped wedge which are obtained in this manner can be juxtaposed, as to the individual color components, with the measured values of the calibrating original. In the event that it is indicated in connection with the calibrating original at which copying density value of a certain field of the gray stepped wedge there are obtained copies of an overall satisfactory quality, it is possible to calculate the necessary changes of the copying light amount for the respective field of the gray stepped wedge with a satisfactory degree of approximation. The changes in the copying light amount which are calculated in this manner can then be exactly transferred into the color exposure control arrangement, so that, as a rule, the correct adjustment of the copying apparatus is achieved after performing only a single calibrating operation.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENT

Figure 1:
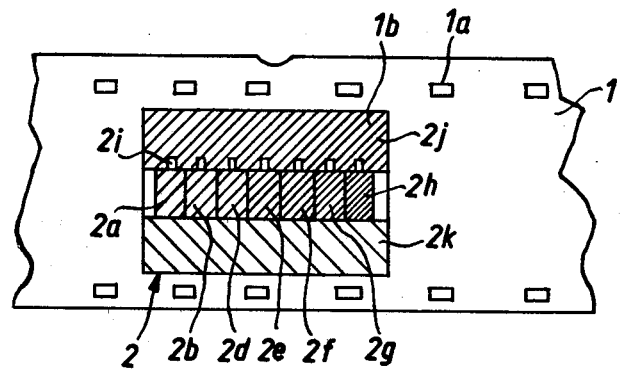
FIG. 1 is a somewhat diagrammatic representation of the composition of a calibrating original.

Referring now to the drawing in detail, and first to FIG. 1 thereof, it may be seen that the reference numeral 1 has been used to identify a strip of a photographic material of a customary type, which, as usual, is provided with perforations 1a serving for the transport of the strip 1 through a photographic camera and for other similar purposes. The film strip 1 is illustrated in its condition following development, wherein an area 1b thereof which corresponds to a film frame is provided with a synthetic testing or calibrating original image 2. This calibrating original 2 includes, in its central region, adjacently arranged fields 2a, 2b and 2d to 2h of a gray stepped wedge. The densities of the fields 2a, 2b and 2d to 2h are so graduated that they progress from a complete transparency in the field 2a to a middle density in the central field 2e to a maximum density in the field 2h. Completely transparent control markings 2i are arranged at the edges of the fields 2a, 2b and 2d to 2h and in spatial juxtaposition therewith, the markings 2i being distributed along a predetermined track and being operative for indicating, during the performance of measuring operations on the gray stepped wedge 2a, 2b and 2d to 2h, when the respective succeeding field of the gray stepped wedge 2a, 2b and 2d to 2h is situated in the scanning range. The gray stepped wedge 2a, 2b and 2d to 2h is surrounded by areas 2j and 2k which have such densities that the entire region of the calibrating original 2 has a middle density and also approximately neutral color distribution.

Advantageously, the calibrating original is produced at a central location, such as in a plant of the manufacturer of the respective film, in the manner discussed above, and then it is supplied to the respective installation which handles (e.g., develops or makes copies from) films of this type. At this location, this film strip 1 is developed in accordance with the conditions prevailing there, so that it is assured that at least approximtely the same conditions exist for the development of the calibrating original image 2 and the customer films which are to be handled therafter.

Figure 2:
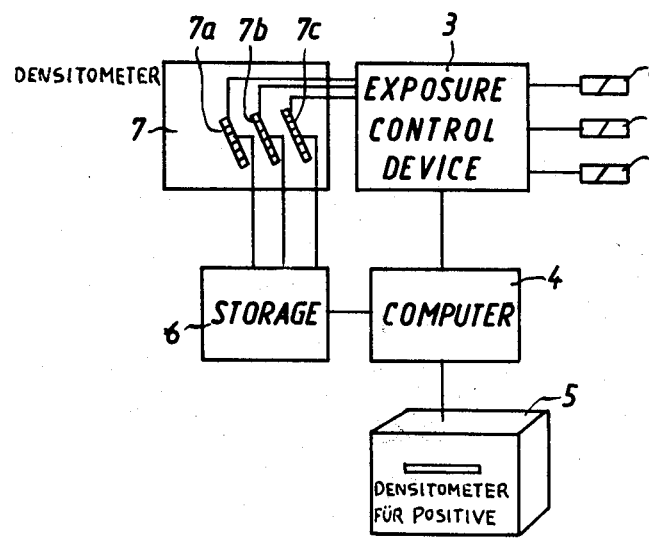
FIG. 2 is a block diagram of an arrangement according to the present invention for evaluating the calibrating original of FIG. 1 as well as a copy thereof for calibrating a color copying apparatus.

Turning now to the block diagram of FIG. 2, it is to be mentioned that the reference numeral 3 identifies a color exposure control device which, as to its construction, may generally correspond to that disclosed in the German Pat. No. 2,246,544 or in the commonly owned U.S. Pat. No. 3,873,199, granted on Mar. 25, 1975, to Volkert Weinert, the disclosure of which latter in this respect is incorporated herein by reference. However, the device 3 of the present invention additionally includes adjustable resistors or potentiometers which are capable of introducing corrective values into the measured data supplied to the color exposure control device 3, these resistors or potentiometers being equipped with and controlled by corresponding adjusting devices which, in turn, are controlled by a computer 4.

The computer 4 is connected, at one of its inputs, with a densitometer 5 which is provided with a slot through which copies of the calibrating original 2 on a photographic copying material can be introduced into the interior thereof for measuring the densities of such copies. Another input of the computer 4 is connected with a data storage 6 in which there can be stored the measured values for the individual color densities of the fields of the gray stepped wedge 2a, 2b and 2d to 2h of the calibrating original. These measured values are supplied to the storage 6 by the photoelectric arrangement of a further densitometer 7 which can be constructed in accordance with FIG. 3. The adjustable potentiometers of the control device 3, as well as the densitometer 5 are of conventional constructions so that no details thereof need be provided herein, in order not to unduly encumber the disclosure.

FIG. 2 further shows, in a purely diagrammatic manner, three photoreceiver units 7a, 7b and 7c, each including a plurality of individual photoreceiving elements of which each can measure, in association with the position of the gray stepped wedge 2a, 2b and 2d to 2h the corresponding color densities thereof. The individual photoelectric receiver elements of the units 7a, 7b and 7c are sensitized to certain colors by respective filters, in a manner well known in this art. Advantageously, and particularly in order to reduce the overall expenditure, the densitometer 7 is simultaneously a part of the photoelectric exposure control device 3 and measures the density values of the color originals from which copies are to be made, and supplies these measured density values to the remainder of the color exposure control device 3. The amounts of light determined by the exposure control device 3 for the individual originals to be copied are used for controlling the energization and deenergization of magnets 8, 9 and 10 which respectively control the interposition of color filters for the individual basic colors into the beam of light travelling between the original and the copying material. This aspect is well known in this field so that it need not be elaborated upon.

Figure 3:
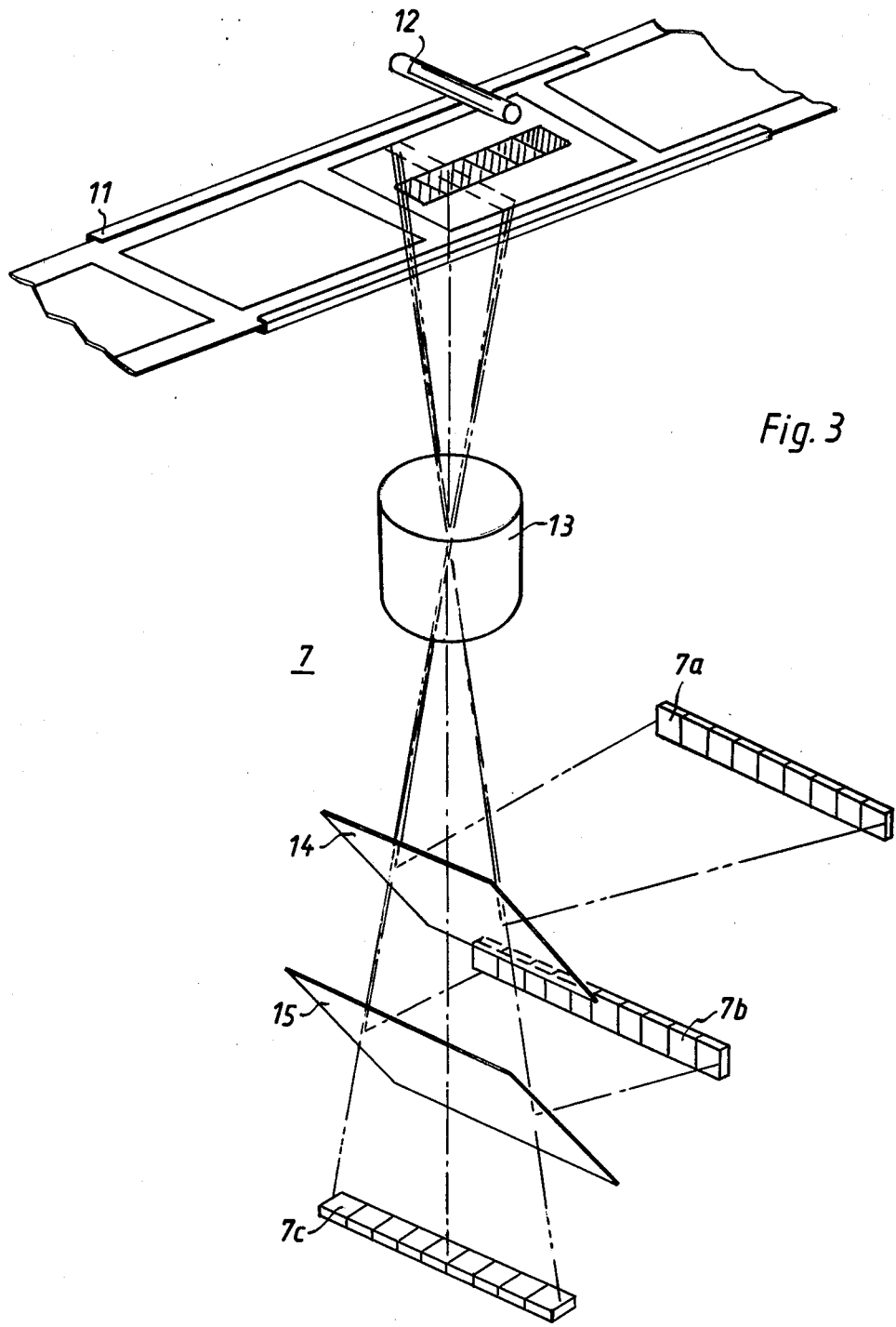
FIG. 3 is a perspective view of the main parts of a densitometer as used for measuring the densities of certain areas of the calibrating original of FIG. 1.

The densitometer 7 for scanning the calibrating original 2 is illustrated in more detail in FIG. 3, at least as to its main components. The reference numeral 11 denotes a guiding arrangement for the film strips including the film strip 1 provided with the calibrating original 2. Upwardly of the guiding arrangement 11 as considered in the drawing, there is arranged a light source 12 capable of uniformly illuminating a strip-shaped section of the calibrating original 2. This strip-shaped section is imaged by an optical system or objective 13 onto a light beam splitter which includes two partially transparent mirrors 14 and 15 which are arranged downstream of one another as considered in the direction of light travel from the source 12 to the copying material. The mirror 14 reflects the blue component but lets the green and red components pass therethrough, while the mirror 15 reflects the red component but lets the green component pass therethrough. The mirrors 14 and 15 are so positioned that the blue component of the original 2 falls exactly onto the unit 7a of photoreceivers, while the red component falls onto the ruler-like unit 7b of photoreceivers and the green component reaches the unit 7c of photoreceivers without being reflected. During the scanning of the calibrating original 2, only those elements or photoreceivers of the units 7a, 7b and 7c onto which the gray stepped wedge 2a, 2b and 2d to 2h is imaged are activated.

Figure 4:
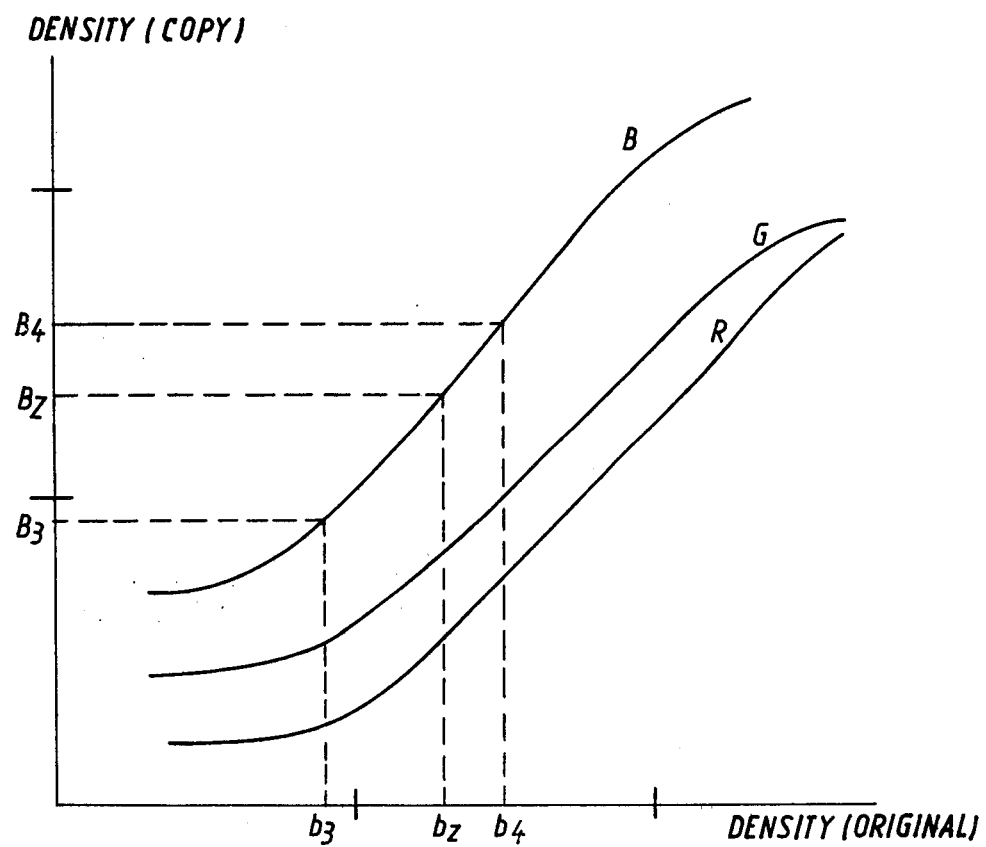
FIG. 4 is a graph depicting transfer functions between the densities of the original and those of the copy.

FIG. 4 is a graphic illustration of a transfer function for the transition from the densities of the sections of the gray stepped wedge 2a, 2b and 2d to 2h of the calibrating original 2 to the corresponding density values of the copy on the copying material. The densities of the calibrating original 2 are indicated for the blue component with the letter b, for the green component with the letter g, and for the red component with the letter r. The respective subscripts correspond to respective fields of the gray stepped wedge 2a, 2b and 2d to 2h. corresponding densities on the copying material are identified by the respective capitals B, G and R and the corresponding subscripts. However, in order to assure easy reading of the graph, respective coordinating lines are shown only for the blue values. Finally, the reference character $B_z$ indicates the desired value for the copy of the blue component of the central field 2e of the calibrating original 2 on the copying material. The graphic illustration shows, in broken lines, the coordinates of the corresponding blue values of the original 2 and of the copy, these coordinates intersecting each other on the blue curve B. From this graphic representation of the transfer function for the color blue, it is possible to ascertain, by entering the actually measured blue value and then obtaining the deviation from the desired value via the intersection with the blue curve B and the corresponding coordinate of the x-axis, what change in the copying light amount is necessary in order to exactly obtain the desired value in the blue range for the next-following copy. Of course, the procedure will be the same for the green and red components, except that the curves G and R will be used instead.

Having so described the construction of the arrangement of the present invention, the operation of this arrangement will now be briefly discussed.

The color density values for each of the seven fields of the gray stepped wedge 2a 2b and 2d to 2h of the calibrating original 2 shown in FIG. 1 are measured by the densitometer illustrated in FIG. 3 and the measured values are fed into the storage 6. Immediately thereafter, there is automatically made a copy of the original 2 on the copying material using exposure determined by the color exposure control arrangement 3 in its momentary condition. The copy is then developed and the developed image on this copy is then measured in the densitometer 5. During this measurement, for each step or field of the copy of the gray stepped wedge 2a 2b and 2d to 2h on the copying material, there are measured the three density values in the individual colors, which are identified by the capital letters $B_u$, $G_v$ and $R_w$, these values being furnished to the computer 4. In the event that the arrangement 3 is properly adjusted to begin with, the three color density values of the central field of the image of the gray stepped wedge 2a 2b and 2d to 2h on the copying material coincide with the respective desired values $B_z$, $G_z$ and $R_z$. On the other hand, when the measured values do not coincide with the desired values, it is necessary to readjust the copying apparatus, that is, the sensitivity of the color exposure control device 3 to the light impinging thereon must be so changed that the changed copying light amount exactly leads to the achievement of the desired densities of the central step of the copy of the gray stepped wedge 2a 2b and 2d to 2h.

In the ideal situation, that is, when the individual color exposures do not mutually influence one another, this correction is made in accordance with the following equation:

$$\Delta(\log I \cdot t) = \frac{d_4 - d_3}{D_4 - D_3} \cdot (D_4 - D_z)$$

The densities d with subscripts correspond to the measured densities of the corresponding steps of the gray stepped wedge 2a 2b and 2d to 2h of the calibrating original 2, while the densities D with subscripts indicate the measured densities of the corresponding steps of the copy of the gray stepped wedge 2a 2b and 2d to 2h on the copying material. $D_z$ indicates the desired copy density.

However, generally speaking, this assumption of absence of mutual influence among the individual colors is inapplicable, inasmuch as the filters in front of the measuring elements do not coordinate the sensitometric properties of the film and the copying filters in an ideal manner. Under these circumstances, the changes in the copying light amounts result from the following equations:

$$\Delta(\log I \cdot t)_B = \Delta B + \alpha_{GB}\Delta_G + \alpha_{RB}\Delta_R$$

$$\Delta(\log I \cdot t)_G = \alpha_{BG}\Delta_B + \Delta_G + \alpha_{RG}\Delta_R$$

$$\Delta(\log I \cdot t)_R = \alpha_{BR}\Delta_B + \alpha_{GR}\Delta_G + \Delta_R$$

wherein the subscripts B, G and R respectively refer to the blue, green and red colors, the $\alpha$ coeficients have absolute values smaller than one and depend on the characteristics of the copying material, of the scanner, and of the densitometer, and the $\Delta$ coefficients are obtained in accordance with the equations $$\Delta_B = \frac{b_4 - b_u}{B_4 - B_u} \cdot (B_4 - B_z),$$

u=3, when $(B_z - B_4) < 0$
u=5, when $(B_z - B_4) > 0$ $$\Delta_G = \frac{g_4 - g_v}{G_4 - G_v} \cdot (G_4 - G_z)$$

v=3, when $(G_z - G_4) < 0$
v=5, when $(G_z - G_4) > 0$; and $$\Delta_R = \frac{r_4 - r_w}{R_4 - R_w} \cdot (R_4 - R_z)$$

w=3, when $(R_z - R_4) < 0$
w=5, when $(R_z - R_4) > 0$ $b_u$, $g_v$ and $r_w$ being the color densities of the respective fields of the stepped wedge zone of the calibrating original.

$B_u$, $G_v$ and $R_w$ being the color densities of the respective fields of the image of the stepped wedge zone on the copying material, and $B_z$, $G_z$ and $R_z$ being the desired color densities of the central field of the image of the stepped wedge zone on the copying material.

These calculations are performed in the computer 4, and the thus ascertained changes in the copying light amounts are directly taken over into the potentiometers of the color exposure control device 3 which, as previously mentioned, may be identical or similar to that disclosed in the aforementioned German Pat. No. 2,246,544 or the U.S. Pat. No. 3,873,199.

In order to make certain that the corrections made resulted in the desired changes in the quality of the copying process, it is possible to make another copy of the calibrating original 2 and to measure the same in the densitometer 5. Under these circumstances, the comparison of the measured values with the respective desired values should lead to the result that the desired density values have been substantially achieved. Only when the deviations of the measured values from the desired density values are significantly greater than one step of the gray stepped wedge 2a 2b and 2d to 2h during the making of the first copy can the linear interpolation according to the aforementioned equations result in inaccuracies which render the above second calibrating step necessary or desirable. However, even in this instance, it is possible to achieve the calibration of the copying apparatus in only one step, especially by approximating the curves according to FIG. 4 by polynominals of the second or third order which, of course, would then require an additional expenditure as far as the computing capacity of the computer 4 is concerned.

The above-discussed calibration of the copying apparatus can be used as well for the initial calibration of the apparatus and also for routine supervision of the performance of the copying apparatus at greater or smaller intervals. For this purpose, the densitometer 5 and the computer 4 can be integrated into a single unit to which the color exposure control devices 3 of several copying apparatuses can be connected one after the other. When the construction is such as indicated in FIG. 2, the storage 6 then would have to be associated with the copying apparatus and be releasably connectable, via a proper connection, to the computer 4.

The characteristic density curves according to FIG. 4, which form the basis for the performance of the calculations, can also be arrived at in a different manner than by means of the gray stepped wedge 2a 2b and 2d to 2h of FIG. 1. In that solution, the production of the different densities in the individual colors is achieved by the use of previously known different intensities of the copying light resulting from the previously known gradation of the gray stepped wedge 2a 2b and 2d to 2h. Instead of varying the copying light amounts by changing the intensity of light, the copying light amounts can be varied by changing the exposure times by predetermined amounts. To achieve this, a first copy is produced from a calibrating original of a known density using the values determined by the photoelectric color exposure control device 3. Subsequently thereto, there is produced a second copy of the same calibrating original, using the so-called density correction of, for instance, one step; that is, the time of exposure in all three colors is linearly increased by a predetermined percentage, so that the change in the copying light amount can be related in direct proportion to the change in the copying density. This renders it possible to draw unmistakable conclusions as to the slopes of the density curves in a certain density range. Now, it is known from experience that the characteristic density curves of the customarily used copying materials all show similar behaviors. It, is thus possible, based on data concerning the slope of the density curve and the approximate position of one point thereof as ascertained from the density of the calibrating original and the first copy thereof, to determine the parameters which, given an otherwise identical curve configuration, result in different behaviors and values for the density curves. Such an approximation by the mathematical function of these density curves is achievable, for instance, in the lower curved region, by using a normal distribution curve, and in the adjacent almost linear region by using a straight line; in this manner, a sufficiently accurate approximation can be obtained. These functions are then fed into the computing program of the computer 4 so that, based on the measured values, the parameters for the exact curve behavior can be calculated and the necessary adjustment of the setting of the color exposure control device can be determined therefrom.

A computer which can be used in or in association with the control unit 4 is manufactured by Digital Equipment Corporation under the designation PDP 11/23.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. A method of calibrating a color copying apparatus, comprising the steps of copying a calibrating original which includes a stepped gray zone having steps of predetermined density and color composition onto a copying material; processing the copying material to obtain a developed image of the calibrating original; measuring the densities of the calibrating original and the developed image thereof in each of the three primary colors; and adjusting the exposure using the equations $$\Delta(\log I \cdot t)_B = \Delta_B + \alpha_{GB}\Delta_G + \alpha_{RB}\Delta_R$$

$$\Delta(\log I \cdot t)_G = \alpha_{BG}\Delta hd\ B + \Delta_G + \alpha_{RG}\Delta_R$$

$$\Delta(\log I \cdot t)_R = \alpha_{BR}\Delta_B + \alpha_{GR}\Delta_G + \Delta_R$$

where
  I is the light intensity during exposure,
  t is the exposure time,
  the subscripts B, G and R, respectively, denote blue, green and red,
  the $\alpha$ coefficients have absolute values smaller than one and depend upon the characteristics of the copying material, and the $\Delta$ coefficients on the right-hand sides of the equations are defined by the expressions $$\Delta_B = \frac{b_m - b_u}{B_m - B_u} \cdot (B_m - B_z),$$

$$\Delta_G = \frac{g_m - g_v}{G_m - G_v} \cdot (G_m - G_z), \text{ and}$$

$$\Delta_R = \frac{r_m - r_w}{R_m - R_w} \cdot (R_m - R_z)$$

$b_m$ and $b_u$ being the blue densities of respective steps on the calibrating original, $g_m$ and $g_v$ being the green densities of respective steps on the calibrating original, $r_m$ and $r_w$ being the red densities of respective steps on the calibrating original, $B_m$ and $B_u$ being the blue densities of the developed images of respective steps on the copying material, $G_m$ and $G_v$ being the green densities of the developed images of respective steps on the copying material, $R_m$ and $R_w$ being the red densities of the developed images of respective steps on the copying material, $B_z$ being the desired blue density of a predetermined field of the developed image of the stepped zone on the copying material, $G_z$ being the desired green density of a predetermined field of the developed image of the stepped zone on the copying material, and $R_z$ being the desired red density of a predetermined field of the developed image of the stepped zone on the copying material.

2. The method as defined in claim 1, wherein the calibrating original includes markings respectively aligned with the steps and operative for scanning control, and areas outside of the stepped zone having such density and color composition that the calibrating original in its entirety has a middle density.

3. The method as defined in claim 1; and further comprising the steps of making another copy of the calibrating original on the copying material using exposure differing by a predetermined percentage from that used during the copying step; determining the characteristic curves of the copying material, by evaluating only that region of each of the copies which corresponds to a region of the calibrating original having an approximately known density; and approximating the characteristic curves, based on parameters derived from the evaluated regions of the copies, by mathematical functions.

4. The method as defined in claim 3, wherein said approximating step includes respectively utilizing a normal distribution curve, and a straight line for the mathematical function in the curved and substantially straight regions of the respective characteristic curve.

5. The method as defined in claim 1, wherein said copying step is performed using an empirical exposure assumed to be correct for achieving the desired density values in the developed image.

6. The method as defined in claim 5, wherein the empirical exposure is determined photoelectrically.

7. The method as defined in claim 1, wherein the color copying apparatus is a photographic apparatus.

8. The method as defined in claim 1, wherein said adjusting step is performed in automatic response to said measuring step.

9. The method as defined in claim 8, wherein the calibrating original has markings aligned with the respective steps and operative for scanning control.

10. The method as defined in claim 1, wherein the individual color exposures do not substantially influence one another and the $\alpha$ coefficients are substantially zero.

11. The method as defined in claim 10, wherein $$\Delta(\log I \cdot t)_B = \frac{b_m - b_{m-1}}{B_m - B_{m-1}} \cdot (B_m - B_z),$$

$$\Delta(\log I \cdot t)_G = \frac{g_m - g_{m-1}}{G_m - G_{m-1}} \cdot (G_m - G_z), \text{ and}$$

$$\Delta(\log I \cdot t)_R = \frac{r_m - r_{m-1}}{R_m - R_{m-1}} \cdot (R_m - R_z).$$

12. The method as defined in claim 1, wherein $B_z$, $G_z$ and $R_z$ are the respective blue, green and red densities of a central field of the image of the stepped zone on the copying material.

13. The method as defined in claim 1, wherein the subscripts m and u represent adjacent steps, the subscripts m and v represent adjacent steps and the subscripts m and w represent adjacent steps.

14. The method as defined in claim 1, wherein
$u = m - 1$ when $(B_z - B_m) < 0$,
$u = m + 1$ when $(B_z - B_m) > 0$,
$v = m - 1$ when $(G_z - G_m) < 0$,
$v = m + 1$ when $(G_z - G_m) > 0$,
$w = m - 1$ when $(R_z - R_m) < 0$, and
$w = m + 1$ when $(R_z - R_m) < 0$.

15. An arrangement for calibrating a color copying apparatus having an exposure control device, comprising measuring means for measuring the densities of the respective steps of a stepped gray zone on a calibrating original in each of the three primary colors and for measuring the densities of the respective developed images of the steps on copying material in each of the three primary colors; and adjusting means for adjusting the exposure control device using the equations $$\Delta(\log I \cdot t)_B = \Delta_B + \alpha_{GB} \Delta_G + \alpha_{RB} \Delta_R$$

$$\Delta(\log I \cdot t)_G = \alpha_{BG} \Delta_B + \Delta_G + \alpha_{RG} \Delta_R$$

$$\Delta(\log I \cdot t)_R = \alpha_{BR} \Delta_B + \alpha_{GR} \Delta_G + \Delta_R$$

where
I is the light intensity during exposure,
t is the exposure time,
the subscripts B, G and R respectively denote blue, green and red,
the $\alpha$ coefficients have absolute values smaller than one and depend upon the characteristics of the copying material, and the $\Delta$ coefficients on the right-hand sides of the equations are defined by the expressions $$\Delta_B = \frac{b_m - b_u}{B_m - B_u} \cdot (B_m - B_z),$$

$$\Delta_G = \frac{g_m - g_v}{G_m - G_v} \cdot (G_m - G_z), \text{ and}$$

$$\Delta_R = \frac{r_m - r_w}{R_m - R_w} \cdot (R_m - R_z),$$

$b_m$ and $b_u$ being the blue densities of respective steps on the calibrating original, $g_m$ and $g_v$ being the green densities of respective steps on the calibrating original, $r_m$ and $r_w$ being the red densities of respective steps on the calibrating original, $B_m$ and $B_u$ being the blue densities of the developed images of respective steps on the copying material, $G_m$ and $G_v$ being the green densities of the developed images of respective steps on the copying material, $R_m$ and $R_w$ being the red densities of the developed images of respective steps on the copying material, $B_z$ being the desired blue density of a predetermined field of the developed image of the stepped zone on the copying material, $G_z$ being the desired green density of a predetermined field of the developed image of the stepped zone on the copying material, and $R_z$ being the desired red density of a predetermined field of the developed image of the stepped zone on the copying material.

16. The arrangement as defined in claim 15, wherein said adjusting means includes a computer connected to said measuring means at its input means and to the exposure control device at its output means and operative for calculating the exposure correction and for adjusting the exposure control device accordingly.

17. The arrangement as defined in claim 16, wherein said measuring means includes a first densitometer for measuring the densities of the stepped zone on the calibrating original and a second densitometer for measuring the densities of the image of the stepped zone on the copying material said first and second densitometers being connected to first and second inputs of said computer, respectively.

18. The arrangement as defined in claim 17; and further comprising a signal storage interposed between said first densitometer and said first input of said computer.

19. The arrangement as defined in claim 17, wherein said first densitometer is constituted by a scanning arrangement of the exposure control device.

20. The arrangement as defined in claim 15, wherein the color copying apparatus is a photographic apparatus.

21. The arrangement as defined in claim 15, wherein the individual color exposures do not substantially influence one another and the $\alpha$ coefficients are substantially zero.

22. The arrangement as defined in claim 21, wherein $$\Delta(\log I \cdot t)_B = \frac{b_m - b_{m-1}}{B_m - B_{m-1}} \cdot (B_m - B_z),$$

$$\Delta(\log I \cdot t)_G = \frac{g_m - g_{m-1}}{G_m - G_{m-1}} \cdot (G_m - G_z), \text{ and}$$

$$\Delta(\log I \cdot t)_R = \frac{r_m - r_{m-1}}{R_m - R_{m-1}} \cdot (R_m - R_z).$$

23. The arrangement as defined in claim 15, wherein $B_z$, $G_z$ and $R_z$ are the respective blue, green and red densities of a central field of the image of the stepped zone on the copying material.

24. The arrangement as defined in claim 15, wherein the subscripts m and u represent adjacent steps, the subscripts m and v represent adjacent steps and the subscripts m and w represent adjacent steps.

25. The arrangement as defined in claim 15, wherein
$u = m - 1$ when $(B_z - B_m) < 0$,
$u = m + 1$ when $(B_z - B_m) > 0$,
$v = m - 1$ when $(G_z - G_m) < 0$,
$v = m + 1$ when $(G_z - G_m) > 0$,
$w = m - 1$ when $(R_z - R_m) < 0$, and
$w = m + 1$ when $(R_z - R_m) > 0$.

26. The arrangement as defined in claim 15, wherein said adjusting means is arranged to adjust the exposure control device in automatic response to a predetermined difference between an actual and a desired density value.

27. The arrangement as defined in claim 15, wherein said exposure control device comprises photoelectric means.

* * * * *